May 12, 1970 R. C. HARRIS ET AL 3,511,674
CERAMIC POTTING COMPOSITIONS
Filed Sept. 29, 1965
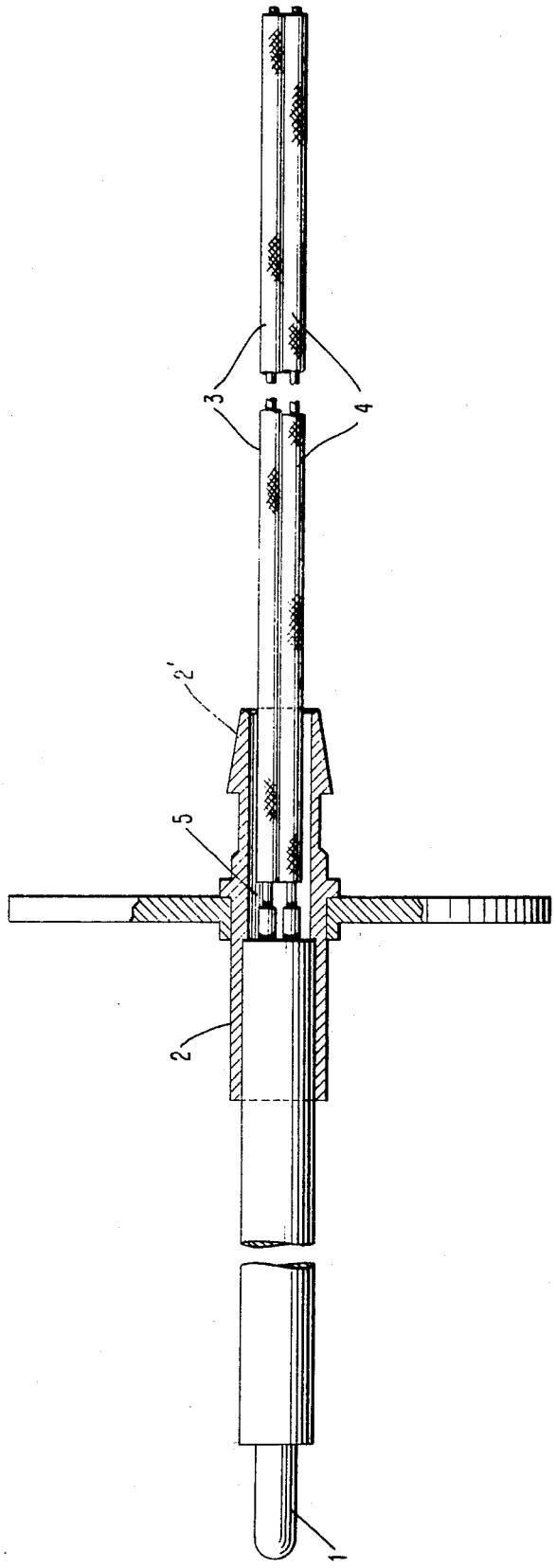
INVENTORS
JOSEPH HENDRICK
ROBERT C. HARRIS
BY
Bauer and Seymour
ATTORNEYS

United States Patent Office 3,511,674
Patented May 12, 1970

3,511,674
CERAMIC POTTING COMPOSITIONS
Robert C. Harris, Unadilla, and Joseph Hendrick, Sidney, N.Y., assignors to The Bendix Corporation, a corporation of Delaware
Filed Sept. 29, 1965, Ser. No. 491,147
Int. Cl. C04b 7/02
U.S. Cl. 106—85                       6 Claims

ABSTRACT OF THE DISCLOSURE

A potting composition of calcium silicate and monoaluminum phosphate, in which the calcium silicate has been stablished against immediate reaction with the monoaluminum phosphate by treatment with an acid, such as oxalic acid, citric acid, phosphoric acid or dilute sulphuric acid, whereby a slurry of said compounds has a shelf of at least thirty minutes at room temperature. The invention includes a method of using said slurry and the ceramic produced.

---

This invention relates to the stabilizing of calcium silicate, a useful form of which is Wollastonite, which is reputed to be stable, but is shown by our researches to be active and unstable, particularly in the presence of water and solutions of salts. Because of its instability it has been regarded as erratic when used in the making of certain ceramics, cements and potting compounds. This erratic behavior is the more objectionable as the requirements of use become more stringent and as excellence of properties becomes the more critical. Among such uses are potting and sealing compounds for electrical insulations and this invention will be described with occasional reference to that use.

The increased temperatures, vibration, and mechanical shock encountered in modern space age missiles and vehicles requires that electronic components be firmly and safely fixed in place by compositions which withstand wide extremes of temperature, vibration and shock. Considerable work has been directed in recent year toward the development of organic and inorganic (ceramic-type) potting and encapsulating materials for setting and sealing electronic components in appropriate cases and containers. The high packaging density striven for in such components requires that no movement occur which would result in short circuits, abrasion, or other damage to delicate wires, connections and components.

Some potting compounds, of organic type, for instance epoxies and silicones, have had limited success for short periods of time but when exposed for more than a few hours to temperatures of about 400° F. have degenerated with the production of gas, and the decomposition of the organic phase, and have suffered excessive changes in dimension. Furthermore, they have had insufficient resistance to radiation, are readily disintegrated in certain media, and are too volatile. This has lead to the use of inorganic potting compounds where superior properties are necessary. Such ceramic materials withstand the effects of high temperature and several types have been developed. However, the known ceramic cements have also had certain limitation when used in electronic applications. For example, the sodium and potassium silicates when combined with water and an inert filler such as clay, groundup porcelain or dinnerware scrap, zircon, or other powdered minerals can be cured or dried to a hard, strong shape. However, in massive form they are difficult to cure to complete dryness, and at elevated temperatures the sodium and potassium ions become mobile and drastically reduce the electrical insulation resistance.

Other cements, of magnesium oxychloride, have also been prepared. They set with the formation of combined water, which limits their usefulness.

Another type is the phosphoric or oxide-phosphate cements which have found use in structural applications in the refractory brick and cement industries and as bonding agents. In making them, phosphoric acid solutions have been reacted with chemically neutral ceramic compounds such as aluminum oxide or basic compounds of calcium and magnesium to form hard, dense shapes, but they have proved to be highly corrosive and unpredictable in hardening. Commercially available metal-phosphate-water solutions have been found safer to handle in production and when mixed with suitable ceramic powders have been cast and cured to form hard, dense, and electrically insulative forms. When mixed with aluminum oxide powder to form a slurry which can be poured, these metal-phosphate-water solutions remain stable but, before use, they must be air dried and heated to a minimum of 650° F. to convert them to permanent non-reversible ceramics. Such mixtures are useful for coatings but in massive castings they dry slowly, shrink excessively, and corrode metals with which they are in contact.

Another type of composition employs fused magnesium oxide or ceramic compounds of magnesium silicate. These react chemically with solutions of aluminum phosphate to form solid shapes, but the reaction occurs too rapidly, at room temperature within a few minutes of mixing, and much heat is evolved. Calcium compounds have been tried, particularly the calcium silicates, and have been found to react very much as do the magnesium oxides. Calcium silicate was a promising material to work with but proved to be uncertain in its reactions, difficult and unsatisfactory, being variable in speed of reaction. Although reputed to be stable, it has been shown by our research to be active and unstable, particularly in the presence of water and solutions of salts. These researches have discovered the unsatisfactory nature of calcium silicate ceramics, for these uses and such products, and have led to the present invention.

In making this invention it has been necessary to establish a standard or stability. The standard of stability which we have adopted is stability in an aqueous slurry of monoaluminum phosphate solution, stability being measured in minutes of time without substantial reaction at room temperature. The stability of about 30 minutes is regarded as adequate for many uses and may be regarded as a generally useful degree of stability. Within this period of time, setting should not begin at room temperature. The present invention provides calcium silicate of far greater stability than this when it is needed.

This invention also provides a stable calcium silicate, the setting of which in appropriate aqueous medium can be initiated by simple methods which are readily employed without special techniques.

An object of the invention is to stabilize calcium silicate against immediate reaction with phosphate solutions, a test of stability being reactivity with monoaluminum phosphate. Another object is to form a stable slurry of monoaluminum phosphate and calcium silicate having substantial shelf life at room temperature, but which will set quickly and hard at a temperature only a little higher than room temperature and well within the efficient heating range of common heat generators such as flame and low energy electric heaters, and at temperatures not distressing to operators. Another object is to produce set and sealed compounds having excellent resistance to high temperature, e.g., up to 2000° F. or higher, under onerous conditions of use.

Setting time is the time between the initiation and completion of setting to form a solid, rigid form. This should be as short as possible to avoid corrosion of delicate components, while the period of stability should be long enough to allow mixing, degassing, and the filling of molds, pressure guns or syringes, but when that has been completed it is desirable that the setting should proceed rapidly without foaming, cracking, or such movement as might displace wires or other components of an electrical apparatus. It is therefore another object of the invention to develop a ceramic mix which can be poured, pressure cast, or vibrated into containers holding electronic components to serve as supports, and seals.

Another object was to devise a liquid slurry with a relatively long shelf life, which after potting into a system or box could be set or hardened immediately by a triggering action which would not harm the elements in contact with it. Another object was to develop a heat resistant material which would serve as electrical insulation at high temperatures and which would not generate gas, decompose, shrink or crack.

Another object was to develop a castable ceramic which, after setting, could be cured to a stable, permanent material, at low temperature, below 650° F., so as not to damage electrical components with which it is to be used.

It is also an object to develop a cured ceramic containing no combined water, water of hydration, nor any sodium or potassium. Another object was to develop a material which, when cured, would adhere strongly to metals, ceramic or glass without imposing harmful stresses. Yet another object was to develop a fluid ceramic slurry which could be modified to form a light weight, thermally nonconductive mass, without foaming or expanding it by the use of gas-producing ingredients which have heretofore tended to create undesirable movement of the wire and other components.

Before the objects related to compositions could be accomplished, it was necessary to invent a method by which calcium silicate could be stabilized, and this has been done, in the present invention, by mixing calcium silicate with an aqueous solution of an acid which forms a calcium salt of low solubility in water. We have discovered that acids which form calcium salts of not substantially more than .3 g. per 100 ml. of cold water are satisfactory. Among these are oxalic acid, citric acid, phosphoric acid, and dilute sulphuric acid.

In many of the tests of the invention the material used was Wollastonite, which is largely calcium silicate with a few percent of miscellaneous, inert minerals. This substance had rapid and unpredictable set when made into a slurry with phosphate solution and was consequently an ideal substance to use for experimentation. The testing solution was aluminum phosphate in 50% water solution. It was discovered that the calcium silicate powder could be stabilized before admixture with the solution by mixing it with the acid solution. When citric acid was used, crystals of the acid equal to 2-20% by weight of the powdered calcium silicate were dissolved in water. Varying amounts of water were tried but all practical purposes were served when 100 g. of the mixed calcium silicate and citric acid were mixed with 500 milliliters of water. The limits of 2-20% are limits beyond which the efficiency of stabilization is either not increased or is reduced. Oxalic acid produces longer sets with less acid.

In carrying out the invention the citric acid was dissolved in water, the calcium silicate powder was mixed with the solution by agitation, allowed to settle after thorough mixing, and the liquid was decanted. The powder can be washed with water without affecting the stability of the product. With or without washing it can be dried and stored without loss of its stability.

When the stabilized calcium silicate was to be used in a potting compound, it was stirred in aluminum phosphate solution, the solution was degassed under vacuum and put into the cavity which was to be filled, by any common method such as pouring, injection molding, or use of syringes and pressure guns. A vibratory table is frequently used to insure the complete filling of the mold or the cavity which is to be filled. This slurry is stable for at least ½ hour under the test given hereinabove. Once the cavity is filled with the solution, setting can be accomplished by raising the temperature of the potting compound in the cavity by moderately raising the temperature. When warmed to 130–180° F. the mass sets almost simultaneously throughout its mass.

The stability of the product produced by treatment with the citric or equivalent acid, varies with the concentration of the acid solution, as explained in the following table, but in the case of treating calcium silicate with 8% citric acid the slurry of calcium silicate and aluminum phosphate would set, at room temperature, at about an hour. During this period of time the surfaces of the metal are etched, giving strong adherence to the metal without weakening it. A similar effect can be obtained by sanding, sand blasting or other means to roughen the metal surface before admitting the potting compound. This step is particularly useful where initiation of set is by means of heat.

TABLE I.—SET TIME FOR TREATED CaO SiO$_2$

| Example | Citric acid | Calcium silicate, percent | Useable time (minutes) | Set time (minutes) |
|---|---|---|---|---|
| 1 | 0 | 100 | 0 | 0–1 |
| 2 | 2 | 98 | 23 | 33 |
| 3 | 4 | 96 | 33 | 46 |
| 4 | 6 | 94 | 44 | 59 |
| 5 | 8 | 92 | 58 | 69 |
| 6 | 10 | 90 | 77 | 105 |
| 7 | 15 | 85 | 113 | 183 |
| 8 | 20 | 80 | 145 | 205 |

When 2% oxalic acid was used in place of citric acid the set time was 43 minutes. Similar increases in setting time attended the use of other percentages of oxalic acid.

In theory the acid treatment forms in insoluble salt, of the acid employed, on the calcium particles in the surface of the calcium silicate grains so that, in the case of citric acid, the surface of each grain will contain calcium as the silicate and the citrate. It is not understood why this should have produced stability and the applicant is not to be bound by the theory, the fact of stability having been demonstrated.

A mixture of citric acid and calcium silicate was between 0–20% of the former and 100 and 80% of the latter.

The part of the invention thus far described has made it possible to create new and superior compositions of matter by combining the stabilized calcium silicate with monoaluminum phosphate. Example 9 is typical of the procedure used in Examples 1–9, and of the potting method of the invention.

EXAMPLE 9

8 g. of citric acid crystals were dissolved in 500 cc. of water, to which 92 g. of calcium silicate were added, with agitation, for several minutes. The mixture was allowed to settle for 30 minutes and the liquid was decanted leaving a wet, finely divided solid. The unreacted citric acid went off in the liquid. The solid residue was dried at 220–280° F. A solution of monoaluminum phosphate containing 50% Al(H$_2$PO$_4$)$_3$ was mixed with the stabilized calcium silicate in a ratio of 70 cc. to 100 g. of the latter. The dried, stabilized calcium silicate was stirred iwth the aluminum phosphate solution to a creamy suspension from which the gases were evacuated under vacuum until the foam on the surface of the mass collapsed. A syringe having a 15-gauge hypodermic needle was filled with the slurry. A probe as hereinafter described had its cavity filled from the syringe. The injection was accompanied by gentle vibration to assist the slurry to reach all parts of the cavity. The potted assembly stood for 30 minutes at room temperature and was then transferred to an oven at 130–150° F. The slurry set in less than a minute and was cured for an hour at 130–150° F., for an hour at 160–200° F., for an hour at 210–250° F. and for 8 hours at 230–270° F., after which it was cooled to room temperature. The seal was absolute, the adherence of the composition to the metal was very strong, and the electrical resistance was very high. There was no observable change in volume during the operation.

The following are the ranges of utility for these compositions:

Calcium silicate—98% to 80% by weight
Citric acid—2% to 20% by weight
Water—250 cc. to 1000 cc. per 100 g. of combined calcium silicate and citric acid
50% solution of monoaluminum phosphate—50 cc. to 100 cc. per 100 g. of stabilized calcium silicate The following table shows properties of these ceramics when cured to 500° F.

TABLE II

Properties of thermal set ceramic potting compound cured to 500° F.

Cured shrinkage—Negligible
Bulk density—Approximately 100 lbs./cubic foot
Dielectric strength—Greater than 95 volts/mil on ¼" thick disk
Insulation resistance—500 VDC megger, ¼" thick sample

| Room temperature, °F.: | Megohms |
| --- | --- |
| 200 | Infinity |
| 400 | Infinity |
| 600 | 300 |
| 800 | 500 |
| 1000 | 130 |
| 1200 | 30 |

In potting large boxes it is desirable to cast the shape which shows no shrinkage after curing. With such use we have found that calcium silicate with coarser particle size containing 5–12% of colloidal aluminum oxide is preferred. The following formula is typical of such types:

Stabilized calcium silicate (after treatment by 8% citric acid)—90%
Aluminum oxide—10%
Monoaluminum phosphate solution—30–100 cc. per 100 g. of ceramic batch Another modification of the thermal-set, calcium silicate type, is to produce it as a light weight potting compound. This, again, is a novel composition of matter because it does not bloat or foam and is consequently of the highest utility in boxes containing delicate electronic components. The slurry can receive additions of lightweight aggregate such as aluminum oxide bubbles, glass bubbles, vermiculite and perlite. Density of the shape will vary according to the quantity of such materials admixed therewith. A typical formula is:

EXAMPLE 10

Calcium silicate (stabilized by 8% citric acid)—85%.
Vermiculite—15%
Monoaluminum phosphate solution—80 cc. per 100 g. of batch This material can be poured and vibrated into place. It is not degassed and may be set thermally as wih the dense materials. When cured, it has a bulk density of 59 lbs. per cubic foot.

Mention has been made hereinabove of phosphoric acid as a stabilizer. A typical example involved acidifying 500 milliliters of water with 6 milliliters of 85% phosphoric acid solution and introducing 100 g. of calcium silicate with agitation. After separating the solids from the solution, drying, and mixing with monoaluminum phosphate solution to form a slurry, it was found that no set occurred for 30 minutes. Warming in an oven has caused immediate set. Increased concentrations of phosphoric acid were tried with satisfactory results. For many applicants, however, a product stabilized with citric acid is preferred.

Among the advantages of this invention are the stabilization of calcium silicate, the stabilization, at will, of calcium silicate for selected and different periods of time, the formation of new and superior potting compounds utilizing slurries of stabilized calcium silicate and aluminum phosphate, the heat responsive nature of the composition which enables it to be set by a small rise in temperature, the construction of lightweight bodies, and the superior qualities of the seals provided by their use.

The use of the invention is illustrated in the accompanying drawing which is a side view partly in section of a thermocouple probe assembly which is to be potted. In this drawing a thermocouple has a probe 1 which is to be introduced into the hot region, the temperature of which is to be measured, which is set in a sleeve 2 and attached to the chromel wire 3 and the alumel wire 4 which constitute the thermocouple proper. The sleeve 2 has a force fit over probe 1 and extends over the ends of the wires 3, 4 without touching them, leaving a space 5 which is to be potted. A syringe with a hypodermic needle is filled with the novel potting compound and the space 5 is filled by injection with or without vibration of the sleeve. As soon as the filling is complete, the extension 2' of the sleeve is heated to about 150° which immediately sets the slurry.

Although only a limited number of embodiments of the invention have been illustrated in the accompanying drawing and described in the foregoing specification, it is to be expressly understood that various changes may be made therein without departing from the spirit and scope of the invention as will now be apparent to those skilled in the art.

What is claimed is:
1. A slurry of calcium silicate which has been stabilized against immediate reaction with monoaluminum phosphate by mixing the calcium silicate with an aqueous solution containing from about 2% to about 20% by weight of the calcium silicate of an acid which forms calcium salts having a solubility of not more than 0.3 g. per 100 mls. of cold water and from about 30 to about 100 cc. of a 50% solution of monoaluminum phosphate to each 100 g. of stabilized calcium silicate, said slurry having a shelf life of at least 30 minutes at room temperature and a quick-setting temperature above 100° F.

2. A potting composition consisting in its essential ingredients of a water slurry of stable calcium silicate and monoaluminum phosphate, as set forth in claim 1 in which the acid is selected from the group consisting of oxalic acid, citric acid, phosphoric acid, and dilute sulphuric acid.

3. A method of potting which comprises stabilizing calcium silicate by mixing it wth a solution containing from about 2% to about 20% by weight based on the calcium silicate, of an acid which forms calcium salts having a solubility of not more than 0.3 g. per 100 ml. of cold water, mixing the stabilized calcium silicate and monoaluminum phosphate in aqueous medium in which the mixture is equivalent to about 30 to 100 cc. of a 50% solution of monoaluminum phosphate to each 100 g. of stabilized calcium silicate, filling a space with the mixture and setting the mixture.

4. A method according to claim 3 in which electrical components are placed in said space prior to filling the space with said mixture.

5. A method according to claim 3 in which the potted mass is set by applying heat thereto.

6. A light weight potting slurry comprising a mixture of stabilized calcium silicate and monoaluminum phosphate according to claim 1 and a substantial content of lightweight aggregate.

References Cited
UNITED STATES PATENTS

| | | | |
|---|---|---|---|
| 2,236,296 | 3/1941 | Miniott et al. | 106—308 |
| 2,259,481 | 10/1941 | Mowlds | 106—306 |
| 2,314,188 | 3/1943 | Allen | 106—306 |
| 2,619,426 | 11/1952 | Greger | 106—85 |
| 2,687,967 | 8/1954 | Yedlick | 106—39 |
| 3,148,996 | 9/1964 | Vukasovich et al. | 106—85 |
| 3,167,439 | 1/1965 | Vukasovich et al. | 106—85 |

TOBIAS E. LEVOW, Primary Examiner

S. E. MOTT, Assistant Examiner

U.S. Cl. X.R.

264—61